United States Patent
Ebner et al.

(10) Patent No.: US 6,433,087 B1
(45) Date of Patent: Aug. 13, 2002

(54) HIGH RESISTANCE POLYPROPYLENE TUBE

(75) Inventors: Karl Ebner, Bad Hall; Roland Konrad, Linz; Stefan Schiesser, Leonding; Klaus Bernreitner, Linz, all of (AT)

(73) Assignee: Borealis GmbH, Schwechat-Mannswoerth (AT)

( * ) Notice: Subject to any disclaimer, the term of this patent is extended or adjusted under 35 U.S.C. 154(b) by 0 days.

(21) Appl. No.: 09/581,862

(22) PCT Filed: Dec. 29, 1998

(86) PCT No.: PCT/EP98/08487
§ 371 (c)(1),
(2), (4) Date: Jul. 31, 2000

(87) PCT Pub. No.: WO99/35430
PCT Pub. Date: Jul. 15, 1999

(30) Foreign Application Priority Data

Dec. 30, 1997 (DE) .......................... 197 58 124

(51) Int. Cl.$^7$ .................... C08L 23/00; C08L 23/04
(52) U.S. Cl. ...................... 525/191; 525/240
(58) Field of Search ................ 525/191, 240

(56) References Cited

U.S. PATENT DOCUMENTS 4,458,723 A * 7/1984 Nojiri et al. ............. 138/149
5,948,865 A * 9/1999 Shimazaki et al. ........ 525/193

FOREIGN PATENT DOCUMENTS

| DE | 3704207 | 8/1988 |
| DE | 4001157 | 7/1991 |
| DE | 19 718900 | 11/1998 |
| EP | 0457455 | 11/1991 |
| EP | 0791609 | 8/1997 |

OTHER PUBLICATIONS

Römpp, Chemie–Lexikon, 9th edition, (1990) vol. 2, p. 861.

Römpp, Chemie–Lexikon, 9th edition, (19992) vol. 5, pp. 3566–3567.

* cited by examiner

Primary Examiner—Nathan M. Nutter
(74) Attorney, Agent, or Firm—Jordan And Hamburg LLP

(57) ABSTRACT

The invention relates to a high resistance polypropylene tube especially with a high modulus of elasticity in extension, high impact strength, annular rigidity and resistance towards knocks. The inventive tube is made of polypropylene and has a modulus of elasticity in extension of 1300–2300 N/mm$^2$ and an impact strength of 60–110 kJ/m$^2$. The inventive tube is produced by extrusion of a plastic moulding material consisting of two constituents A and B of composition A) 80–98 mass parts of an isotactic polypropylene homopolymer as a coherent matrix constituent with a decade regularity of >95% and B) 2–20 mass parts of a copolymer, consisting of 50–70 mass parts of propylene and 30–50 mass parts of ethylene and/or other C4–C8-α-olefins as a dispersedly distributed elastomer component. The intrinsic viscosity ratio of both components B/A is 0.9–1.5 and the melt flow index of the moulding material is 0.15–0.8 g/10 min. The polypropylene tubes are suitable for use in waste water systems, especially as gully pipes, rainwater pipes, domestic drainpipes, or sound insulation pipes or shaft elements.

7 Claims, No Drawings

HIGH RESISTANCE POLYPROPYLENE TUBE

The invention relates to a high strength polypropylene pipe and especially to one with a high modulus of elasticity in tension, a high notch impact strength and an annular rigidity and resistance to impact stresses.

Above all, the pipes are intended for waste water systems, especially as sewer pipes.

The use of stoneware, concrete, and cast iron pipes for the construction of sewers has long been known. The susceptibility of these rigid materials to fracture is a disadvantage, so that pipes produced from them frequently break due to external influences, such as earth movements, installation errors and other stresses, and the emerging seepage causes ecological damage in the surrounding soil and in the water table.

On the other hand, the use of sewer pipes of thermoplastic materials, which are produced in a known manner in different dimensions by extrusion, is particularly advantageous. Because of their low weight, good thermoplastic weldability, high fracture toughness, corrosion and abrasion resistance, polyethylene and polypropylene are preferred to other raw materials and ensure that the sewer systems have a high functional reliability for a long time. Other reasons for the increasing importance of these materials in the pipe sector are their environmental compatibility, low installation costs and problem-free recycling.

Several standards and draft standards, such as EN 1852, pr EN 1401, CEN/TC 155 WI 009 Document 155/13 N322, DIN 19537, DIN 16961, DIN V 19534-1 and Draft DIN 19566, contain state-of-the-art stipulations concerning dimensioning, material properties, test methods and the use of plastic pipes in waste water disposal plants.

However, the construction of highly efficient waste water disposal systems and the implementation of installation and restoration work when outside temperatures are low, presuppose new materials with even better use properties. The relevant requirements relate, in particular, to stable, large-diameter plastic pipes with a strength, which meets service requirements, a low temperatures ductility and use temperatures of up to 90° C.

Methods are known for increasing the strength of polypropylene pipes by forming a composite. According to DE 94 16 759 U1 and DE 296 12 040, the pipes are covered with a solid fiber material or a reinforcing braiding and subsequently are jacketed with plastic or an outer pipe. EP 0 762 032 describes an extrusion method for producing multilayer composite pipes. The inner and outer walls of said pipes consist of different polymer materials, which are modified before being processed with adhesion promoters and fillers.

These methods produces composite pipes having a pressure and temperature resistance higher than that of non-reinforced pipes. However, the high production costs in the form of a method of several steps, the different materials that are used and the increase in weight due to the composite construction are disadvantages.

According to EP 0 385 465, the corrugated configuration of the outer wall of sewer pipes leads to a greater annular rigidity. Starting out from this premise, the method describes the production of composites of a smooth inner pipe and a corrugated outer pipe.

The advantageous increase in annular rigidity with double pipes with an external profile is offset also here by the disadvantages of a costly production process, the high weight of the double pipes and the complicated technique of connecting pipes.

Furthermore, from the patent literature, other processes are known for increasing the rigidity and strength of polypropylene. In particular, by the admixing elastomers (WO 96/37549, DE 40 19 456), by the broadening of the molecular weight distribution (WO 96/11216, DE 43 30 661), by the production of reactor blends (DE 40 01 157) and by the addition nucleating agents (DE 44 07 327), ways are described which, although they represent partial solutions, do not lead to rigidity-toughness relationships corresponding to the actual performance requirements of high-performance pipe material.

It is an object of the present invention to take into account the higher demands placed on pipe materials and to provide a polypropylene molding composition, which has at the same time a very high modulus of elasticity in tension, a very high rigidity and a very high strength and, with respect to its Theological properties and to the materials used, can be extruded advantageously into pipes.

Although the opposite courses of rigidity and toughness in the improvement of properties of multiphasic polypropylene blends set limitations, it was possible to develop molding compositions from propylene and ethylene in a two-step polymerization process using ZIEGLER-NATTA catalysts and to produce extrusion pipes from these compositions, the mechanical strength of which is significantly improved relative to that of known and comparable plastic pipe materials.

The object of the invention is a polypropylene pipe, in particular, a high-strength polypropylene sewer pipe, characterized by a modulus of elasticity in tension of 1,300 to 2,300 N/mm$^2$ and preferably of 1,500 to 2,000 N/mm$^2$ and a notch impact strength of 60 to 110 kf/m$^2$ and preferably of 70 to 100 kJ/m$^2$, and produced by extruding a thermoplastic molding composition consisting of two components A and B having the composition of A) 80 to 98 parts by weight and preferably 87 to 97 parts by weight of an isotactic polypropylene homopolymer as a coherent matrix component with a decade regularity of more than 95% and B) 2 to 20 parts by weight and preferably 3 to 13 parts by weight of a copolymer, consisting of 50 to 70 parts by weight of propylene and 30 to 50 parts by weight of ethylene and/or other C4–C8α-olefins as a dispersely distributed elastomeric component, with an intrinsic viscosity ratio of the two components B and A of 0.9 to 1.5, as well as with a melt index of the molding composition of 0.15 to 0.8 g/10 min. and preferably of 0.2 to 0.5 g/10 min.

B is a copolymer, which consists preferably of 55 to 65 parts by weight of propylene and 35 to 45 parts by weight of ethylene.

As a result of the high modulus of elasticity in tension and the high notch impact strength, the annular rigidity, which is particularly important for pipes, is also increased.

The invention is also characterized by the polypropylene pipe for the reason that the annular rigidity SN (kN/m$^2$) of solid wall pipes with smooth inner and outer surfaces, and moreover independently of the configuration of the respective pipe ends, with an external diameter of $\geq 20$ mm to $\leq 2000$ mm, satisfies the mathematical relationship $$190 \text{kN/m}^2 \times (10/(SDR-1))^3 \geq SN \geq 110 \text{kN/m}^2 \times (10/(SDR-1))^3$$

preferably for the numerical values 162 and 137 kN/m$^2$ (instead of 190 and 110 kN/m$^2$), SDR representing the ratio of the outer diameter to the wall thickness.

In the case of a pipe having the dimensions of an external diameter of 110 mm and a pipe wall thickness of 3.7 mm, this means that the annular rigidity, measured according to ISO 9969 at 23° C., has a value approximately of 6.5 to 7.0 kN/m².

In the case of polypropylene pipes with a wall of any configuration and with an external diameter of ≧40 mm to ≦4000 mm, the mathematical relationship $$2.3 \times 10^6 \text{kN/m}^2 \times W \geq SN \geq 1.3 \times 10^6 \text{kN/m}^2 \times W,$$

should be valid preferably for the numerical values of 1.95 and $1.65 \times 10^6$ kN/m² (instead of 2.3 and $1.3 \times 10^6$ kN/m²), W representing the ratio of the length-related geometrical moment of inertia of the pipe wall to the third power of the center of gravity diameter.

This relates particularly to pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends.

As a consequence of good strength properties, these pipes do not show any breakage when the resistance to external impact stresses is measured under the following standard conditions.

To evaluate the breakage behavior of plastic pipes, two variations of the test method "resistance to external impact stresses" are used under standardized conditions.

According to the periphery method of EN 744, the pipe sections are subjected to the impact of a falling weight, which drops from a specified height upon sites distributed over the periphery. If fractures occur in the pipe, the impact strength fracture rate is determined. This measurement is carried out at 0° C., the mass and the height, from which the weight falls, depending on the outer diameter of the tested pipe and being fixed as standard conditions or test parameters in the standard. For example, the following test parameters apply to a pipe with an outer diameter of 110 mm:

| Temperature | 0° C. |
|---|---|
| Mass of the falling weight | 1.0 kg |
| Height from which the weight falls | 1600 mm |

Plastic pipes, which are installed at temperatures below −10° C., step test of EN 1411 must be carried out, according to this, the pipe sections to be tested are subjected to an impact of a falling hammer with a fixed mass and shape, the impacts forming a sequence of different falling heights. If the pipe is fractured, the falling height is defined as an H50 value, at which 50% of the test pieces of the pipe samples tested fail. As a function of the pipe outside diameter of the pipes, the standard defines these test parameters: temperature, mass, and height from which the weight falls. The following standard measurement conditions apply to a pipe with an external diameter of 110 mm:

| Temperature | 0° C. |
|---|---|
| Mass of the falling weight | 4 kg |
| Falling height of the falling weight | ≧1 m. |

For plastic pipes, which are laid at temperatures below −10° C., the test of the step method of EN 1411 is required in addition. According to this test, the pipe sections, which are to be tested, are in each case subjected to the impact of a falling hammer of fixed weight and shape, the impacts forming a sequence of falls from different heights. If the pipe breaks, the falling height is determined as an H50 value, at which 50% of the sample pieces of the pipes investigated fail. The test parameters, which consist of the temperature, mass and falling height of the falling weight are fixed by the standard as a function of the external diameter of the pipe. The following are the standard measurement conditions for a pipe with an external diameter of 110 mm:

| Temperature | 0° C. |
|---|---|
| Mass of the falling weight | 4 kg |
| Falling height of weight | ≧1 m |

Furthermore, for the purpose of improving the processing and application properties of the thermoplastic molding compositions, from which the polypropylene pipe is produced, the usual additives, such as heat stabilizers, anti-oxidants and/or light stabilizers, anti-static agents, lubricants and mold release agents, pigments/dyes, metal deactivators, nucleating agents, fillers and reinforcing agents and flame retardants can be added in the concentrations customary for such additives.

Preferably, the polymeric pipe material contains 0.01 to 2.0% by weight of one or more nucleating agents.

For the production of the pipes, the thermoplastic molding composition of propylene and ethylene, used for manufacturing the pipes, is prepared in a two-step polymerization method using stereospecific ZIEGLER-NATTA catalysts and metering in hydrogen and employing a pre-polymerization by A) polymerizing propylene at temperatures of 50° to 90° C. and pressures of 20 to 50 bar, and B) polymerizing the mixture of this polypropylene homopolymer and the newly added propylene and ethylene and/or further $C_4$–$C_8$α-olefins at temperatures of 40° C. to 100° C. and pressures of 5 to 30 bar, and processing the thermoplastic molding composition by extrusion into pipes of different diameters with different shapes of the pipe wall.

The polymerization takes place in two steps in two polymerization reactors connected in series. The first reactor is preceded by a pre-polymerization. The prepolymer is transferred, for example, to a LOOP reactor and the polymerization is subsequently carried out in an excess of liquid propylene. The polypropylene homopolymer, formed in the first step of the process, is separated and supplied to the second reactor where, after addition of propylene and ethylene, the corresponding copolymer is formed as a dispersely distributed phase by gas-phase polymerization.

The molecular weight is controlled by adding hydrogen to the reaction system. The following operating conditions are to be employed during the polymerization:

| Polymerization Step 1 | Temperature | 50° to 90° C., preferably 60° to 80° C. |
|---|---|---|
| | Pressure | 20 to 50 bar, preferably 25 to 40 bar. |
| Polymerization Step 2 | Temperature | 40° to 100° C., preferably 60° to 90° C. |
| | Pressure | 5 to 30 bar, preferred 10 to 20 bar. |

To produce the inventive molding compositions, a stereospecific ZIEGLER-NATTA catalyst is used, which consists of several components and, in addition to a titanium-containing solid component, usually also contains an aluminum alkyl compound, as well as an external electron donor compound.

Finely divided aluminum oxides, silicon oxides or magnesium chlorides with a high specific surface area serve as carrier materials for the titanium halides applied, preferably titanium tetrachloride, and electron donors, such as ethers, ketones, lactones, alcohols, mono- or polyfunctional carboxylic acids and their esters, preferably phthalic acid derivatives. The titanium-containing solid component is commercially available and produced by methods known from the literature (such as DE 43 30 661/EP 0 573 862/WO 96/11216/GALLI, Macromolecular Symposium 112, 1–16 (1996)).

Trialkyl aluminum compounds, such as triethyl aluminum, are particularly suitable as co-catalysts. In addition, the catalyst system also contains external electron donors, especially substituted silanes, preferably cyclohexylmethyldimethoxysilane or dicyclopentyldimethoxysilane.

The plastic pipes are produced in a known manner by extrusion from the thermoplastic molding composition. For this purpose, the polypropylene polymer, obtained in the manner described, is melted in an extruder at temperatures of 200° to 260° C., homogenized, extruded through an annular die and subsequently made dimensionally stable by cooling.

Normally, pipes are produced continuously using conventional single-screw extruders, which are provided with a smooth feed zone for the pipe material to be processed. In order to increase the mass throughput, the feed zone can be replaced by one with axially inserted longitudinal grooves. Extruders of this design are equipped with three-zone screws having a length of 20 to 30 D (D=diameter), the task-related screw profile of which makes possible the optimum melting, homogenizing, and conveying of the polymer melt possible.

At the extruder outlet, a pipe die is mounted, in which the melt flow is passed by means of a conically shaped mandrel or a spiral mandrel distributor to an annular die. Installed die plates and sip-shaped mandrel holders correct the melt flow in the sense of a uniform build-up of pressure over the whole cross section of the dies. After leaving the pipe die, the melt passes through a calibrating device, in which it is pressed by means of a vacuum and/or compressed air against the inner wall of the calibration chamber, the melt being solidified by rapid cooling and stabilized dimensionally at the specified dimensions In the subsequent water bath, which is at a temperature of 5° C. to 30° C. and is sufficiently long, the extruded pipe continues to solidify, so that it can subsequently be sawn into pipes of specific lengths.

Industrial pipe production plants consist of the following machine units: extruder with pipe die, calibration, water bath, pipe take-off, pipe saw, and tipping trough.

The inventive pipes have higher values for the modulus of elasticity in tension, the notch impact strength and the annular rigidity. Because of the inherent high rigidity and toughness of the pipes, less material is used in comparison to that used for comparable pipe lengths of previously used polymer materials. As a result, the economic efficiency is affected very positively. In addition, thinner wall thicknesses enable the cooling and take-off rates to be increased during the molding process, so that the extrusion process can be made more effective.

Polypropylene pipes are suitable for waste water systems, in particular, as sewer pipes, rainwater pipes, domestic drain pipes, sound-insulation pipes or as shaft elements.

EXAMPLES 1 to 5

A) Description of Process for Examples 1 to 3

The inventive molding composition of propylene and ethylene is produced continuous in two polymerization steps.

For this purpose, there are two polymerization reactors, which are connected in series and equipped with the usual measuring devices and are equipped for the possibility of the mutual transfer of products. During the course of the polymerization, the specified temperatures, pressures and monomer ratios are kept constant for the two polymerization steps. The metered addition of hydrogen acts as a molecular weight controller. The composition of reaction gas, consisting of propylene, ethylene and hydrogen, is monitored by gas chromatographic measurements and supplemented by conditions additions to keep the concentration ratios in the proportion required by the formulation.

As catalyst component, a commercially available, supported ZIEGLER-NATTA catalyst is used, which is suitable for producing polypropylene in a monomer suspension and in the gas phase.

The first reactor is preceded by a pre-polymerization, which takes place for 2 to 3 minutes at 15° to 20° C. in a separate polymerization reactor in the liquid propylene phase after the solid catalyst component, the triethyl aluminum (TEAL) co-catalyst and the cyclohexylmethyldimethoxysilane (CMDMS) or dicyclopentyldimethoxysilane (DPDMS) external electron donor have previously been added individually or as a mixture.

The resulting pre-polymer is transferred to a LOOP reactor, where it initiates the polymerization in an excess of liquid propylene, forming polypropylene homopolymer. The reactor content is discharged continuously into an interim container, in which the polypropylene and unreacted propylene are separated from one another by evaporation of the monomer. Subsequently, the polypropylene homopolymer is transferred to a second reactor into which a mixture of propylene and ethylene is passed and the corresponding copolymer is formed as a dispersely distributed phase by gas-phase polymerization.

The polypropylene polymer, produced in the manner described, was plasticized in a single-screw extruder (L/D= 30, D=70 mm) at 220° C., pressed with a mandrel through an annular die (external diameter 110 mm) and then calibrated by vacuum into a pipe with an external diameter of 110 mm and wall thickness of 3.7 mm. In the usual manner, this is followed by further cooling in the water bath and pipe take-off, followed by sawing the pipe into lengths The important operating conditions of the machine system are:

Extruder temperatures:

Feed zones 1 to 3: 200°/210°/220° C.

| | |
|---|---|
| Ejection zone: | 220° C. |
| Ring die | 200° C. |
| | screw rpm 40/min |
| | length of water bath 4 ml/temperature 20° C. |
| | vacuum/calibration 200 Torr |
| | take-off speed 0.3 m/min |

B) Specific Process Conditions for Examples 1 to 3

Table 1 shows the synthesis conditions and monomer ratios used, as well as the product properties determined by polymer analysis, arranged according to polymer steps and according to examples.

C) Results of Examples 1 to 3 and of the Comparison Examples 4 and 5

Table 2 shows characteristic material values of Examples 1 to 3, which support the inventive solution, as well as corresponding comparison values of Daplen PP BEC5012 and Daplen HDPE CE4664 which, as conventional, commercial raw materials, correspond to the present state of the art.

The advantageous application properties of the products, produced pursuant to the invention, as well as of the pipes produced therefrom, are clearly shown by the comparison.

D) The product and molded product properties of Examples 1 to 5 were determined by the following methods:

| | |
|---|---|
| Melt Index MFR | ISO 1130/temperature 230° C./nominal load 2.16 kg |
| Ethylene Content | Infrared spectroscopic measurement |
| Intrinsic Viscosity | determined in decalin at 135° C. |
| Decade Regularity | Infrared-spectroscopic determination |
| Modulus of Elasticity in Tension | ISO 527/temperature 23° C. |
| Notch Impact Strength | ISO 179/1eA/temperature 23° C. |
| Annular Rigidity | ISO 9969/temperature 23° C. |
| Resistance to External Impacts: | a) EN 744/peripheral method/temperature 0° C. |
| | b) EN 141 1/step method/temperature 20° C. |
| Dimensional Stability at Elevated Temperatures | a) VICAT-softening temperature VST/B/50/ISO 306 |
| | b) Dimensional stability at elevated temperatures HDT/B/ISO 75 |

| | |
|---|---|
| Density | ISO 1183/temperature 23° C. |
| Preparation of Test Specimen | The polypropylene powder, obtained by the polymerization method described, was stabilized in a laboratory twin-screw extruder at 240° C. and granulated. The test specimen was produced by injection molding at 230°–260° C. Before the characteristic values were determined, the test specimens were conditioned according to the respective provisions. |

TABLE 1

| Parameters | Unit | Example 1 | Example 2 | Example 3 |
|---|---|---|---|---|
| 1st Reactor | | | | |
| Pressure | bar | 33 | 33 | 33 |
| Temperature | ° C. | 70 | 70 | 70 |
| Hydrogen | ppm | 270 | 270 | 270 |
| TEAL/silane | mol/mol | 2 | 2 | 2 |
| 2nd Reactor | | | | |
| Pressure | bar | 12.0 | 12.5 | 12.0 |
| Temperature | ° C. | 65 | 65 | 65 |
| $C_2/(C_2 + C_3)$ | mol % | 0.45 | 0.45 | 0.45 |
| $H_2/C_2$ | mol % | 0.035 | 0.033 | 0.038 |
| Molding Composition | | | | |
| MFR(230° C./2.16 kg) | g/10 min | 0.20 | 0.18 | 0.17 |
| Ethylene content | mol% | 19.5 | 14.5 | 5.6 |
| Intrinsic viscosity B/A | dl/g | 1.50 | 1.24 | 1.16 |
| Decade regularity | % | 96 | 96 | 98 |

TABLE 2

| Characteristic Values | Unit | Test Standard | Parameter | Example 1 | Example 2 | Example 3 | Example 4 Comparison with Daplen PP BEC 5012 nat. | Example 5 Comparison with Daplen HDPE CE4664 nat. |
|---|---|---|---|---|---|---|---|---|
| E Modulus in Tension | N/mm² | ISO 527 | 23° C. | 1524 | 1696 | 1972 | 1200 | 920 |
| Notch Impact Strength | kj/m² | ISO 179/1eA | 23° C. | 104 | 102 | 80 | 52 | 14 |
| Annular Rigidity[1] | kN/m² | ISO 9969 | 23° C. | 5.8 | 6.2 | 6.8 | 4.0 | 3.5 |
| Resistance to external impact stresses | | EN 744 and EN 1411 | 0° C./1.6 kg/ 2000 mm | no breakage | no breakage | no breakage | no breakage | — |
| | | | −20°C 4 kg/ 1000 mm | no breakage | no breakage | no breakage | no breakage | — |
| Dimensional stability at elevated temp. | ° C. | ISO 75[2] | — | 81 | 85 | 98 | 78 | 72 |
| | ° C. | ISO 306[3] | — | 70 | 75 | 87 | 70 | 65 |
| Use temperature | ° C. | — | 23° C. | −20 to 90° C. | −20 to 90° C. | −20 to 90° C. | −20 to 90° C. | −20 to 60° C. |
| Density | kg/m³ | ISO 1183 | 23° C. | 905 | 905 | 905 | 905 | 945 |
| Pipe weight | kg/m | — | — | 1.15 | 1.13 | 1.10 | 1.29 | 1.42 |

[1]Pipe: external diameter-110 mm, wall thickness-3.7 mm
[2]HDT/B
[3]Vicat B
[4]For the same external diameter of the pipe of 110 mm and the same annular rigidity

What is claimed is:

1. Polypropylene pipe having a modulus of elasticity in tension of 1,300 to 2,300 N/mm² and and a notch impact strength of 60 to 110 kJ/m² produced by extruding a thermoplastic molding composition consisting of two components A and B and having the composition of
   A) 80 to 98 parts by weight of an isotactic polypropylene homopolymer as a coherent matrix component with a decade regularity of more than 95% and
   B) 2 to 20 parts by weight of a copolymer consisting of 50 to 70 parts by weight of propylene and 30 to 50 parts by weight of ethylene and/or other C4–C8α-olefins as a dispersely distributed elastomeric component,
   an intrinsic viscosity ratio of the two components B and A being 0.9 to 1.5 and a melt index of the molding composition being 0.15 to 0.8 g/10 min.

2. The polypropylene pipe as defined in claim 1, wherein the annular rigidity SN (kN/m²) of solid wall pipes with smooth inner and outer surface, with an diameter of <20 mm up to an external diameter of <2000 mm, satisfies the mathematical equation $$190 \text{ kN/m}^2 \times (10/(SDR-1))^3 > SN > 110 \text{ kN/m}^2 \times (10/(SDR-1))^3$$

SDR representing the ratio of the external diameter to the wall thickness.

3. The polypropylene pipe of claim 1, wherein the annular rigidity SN (kN/m²) of the pipes with an external diameter of >40 mm up to an external diameter of <4000 mm, fulfills the mathematical relationship $$2.3 \times 10^6 \text{ kN/m}^2 \times W > SN > 1.3 \times 10^6 \text{ kN/m}^2 \times W,$$

W representing the ratio of the length-related geometrical moment of inertia of the pipe wall to the third power of the center of gravity diameter.

4. The polypropylene pipe of one of claims 1 to 3, wherein the pipe resists breakage by external impact stresses.

5. The polypropylene pipe of one of claims 1 to 3, wherein the thermoplastic molding composition contains 0.01 to 2.0% by weight of nucleating agent.

6. A method for producing and processing pipe material of one of claims 1 to 3, wherein the thermoplastic molding composition is produced in a two-step polymerization process in the presence of stereospecific Ziegler-Natta catalyst and with metered addition of hydrogen, the two-step polymerization process comprising:
   A) polymerizing propylene at temperatures of 50° to 90° C. and pressures of 20 to 50 bar to produce the isotactic polypropylene homopolymer, and
   B) polymerizing a mixture of said polypropylene homopolymer and propylene and ethylene and/or other $C_4$–$C_8$α-olefins at temperatures of 40° C. to 100° C. and pressures of 5 to 30 bar.

7. Polypropylene pipe of one of claims 1 to 3, in which the pipe is a sewage pipe or a rainwater pipe or a domestic drain pipe or a sound insulation pipe or a shaft element.

* * * * *